United States Patent [19]

Elskamp

[11] Patent Number: 4,780,044
[45] Date of Patent: Oct. 25, 1988

[54] DEVICE FOR CONTROLLING A LOADING PLATFORM FOR TRANSPORT VEHICLES

[76] Inventor: Hendrika J. Elskamp, Burgemeester van Walsemlaan, 6, 8162 GG Epe, Netherlands

[21] Appl. No.: 151,846
[22] Filed: Feb. 3, 1988
[30] Foreign Application Priority Data Feb. 3, 1987 [BE] Belgium ............................ 8700075

[51] Int. Cl.[4] .............................................. B60P 1/44
[52] U.S. Cl. .................................... 414/557; 414/917
[58] Field of Search ............... 414/546, 556, 557, 917

[56] References Cited

U.S. PATENT DOCUMENTS

| 2,889,059 | 6/1959 | Selzer | 414/557 |
| 2,979,214 | 4/1961 | Selzer | 414/557 |
| 3,842,997 | 10/1974 | Sprikkelman | 414/557 |
| 4,569,626 | 2/1986 | Svanberg | 414/557 |

FOREIGN PATENT DOCUMENTS

| 31000 | 7/1981 | European Pat. Off. | 414/557 |
| 249845 | 11/1986 | Japan | 414/546 |
| 2121375 | 12/1983 | United Kingdom | 414/546 |

Primary Examiner—Robert J. Spar
Assistant Examiner—David A. Bucci
Attorney, Agent, or Firm—William A. Drucker

[57] ABSTRACT

The invention is for a device for controlling a loading platform for transport vehicles, such as goods lorries, which loading platform can close off the loading opening of the transport vehicle and can move a load in horizontal plane between the loading area of the transport vehicle and the surface of the ground. The device consists primarily of a cross-member, a platform adjustable in height, supporting beams, bearing rods installed in parallel and swivel-mounted between the loading platform and the supporting beams, tilting arms which swivel on spindles installed in the cross-member, which tilting arms bear a support on which the loading platform freely rests and which arms are coupled to a tipping cylinder which at one end is connected to the transport vehicle like the guide rods and at least one lifting cylinder which is connected at the other end to the said spindles.

4 Claims, 2 Drawing Sheets

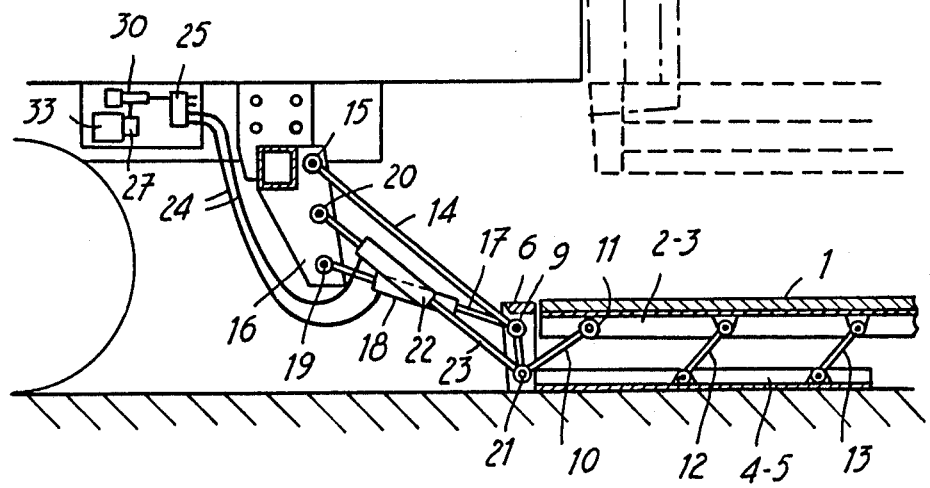
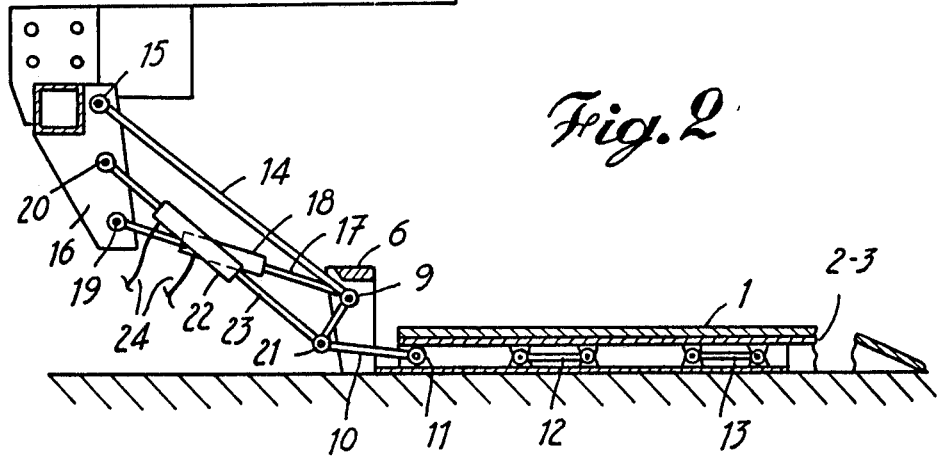

DEVICE FOR CONTROLLING A LOADING PLATFORM FOR TRANSPORT VEHICLES

The invention is for a device for controlling a loading platform for transport vehicles, such as goods lorries, which loading platform can close off the loading opening of the transport vehicle and can move a load in horizontal plane between the loading area of the transport vehicle and the surface of the ground.

A known device is a device which makes use of tipping cylinders for turning the loading platform through an angle of 90°, which it allows it to be placed in both the vertical and horizontal position and which also makes use of lifting cylinders in order to alter the height of the loading platform so that it moves in the horizontal position between the loading surface of the transport vehicle and the surface of the ground.

The height of the rear edge of the loading platform to which the tipping and lifting cylinders are attached by means of swivel joints is however quite high so that even in its lowest position the upper surface of the loading platform is relatively high above the ground surface. In order to allow the front edge of the loading platform to touch the ground surface it is therefore necessary to shape the lower side of the loading platform so that it slopes towards the said edge, so that when this surface rests on the ground surface, the upper surface of the loading platform slopes downwards and the load to be transported can be rolled or slid on or off the loading platform.

A disadvantage of this, however, is that when the underside of the loading platform rests on the ground surface, the upper side of the loading platform assumes a sloping position, so that there is a danger that the load on the loading platform may roll or slide off or that the load tips over, which could result in damage.

In order to correct this disadvantage a device has been realized in accordance with the prime characteristic of the invention which is principally described below. Moreover this device has the advantage that it can be constructed so that it is relatively light and that it permits the installation of a weighing device without much difficulty.

By way of example a more detailed description of a possible but by no means limited embodiment of the device in accordance with the invention is given below. This description refers to the attached drawings, where:

FIG. 1 shows a longitudinal section of the suspended loading platform as described by the invention at the moment that it comes into contact with the surface of the ground;

FIG. 2 shows an enlarged longitudinal section of this loading platform, after it is lowered fully loaded or empty to the surface of the ground;

Figure 3:
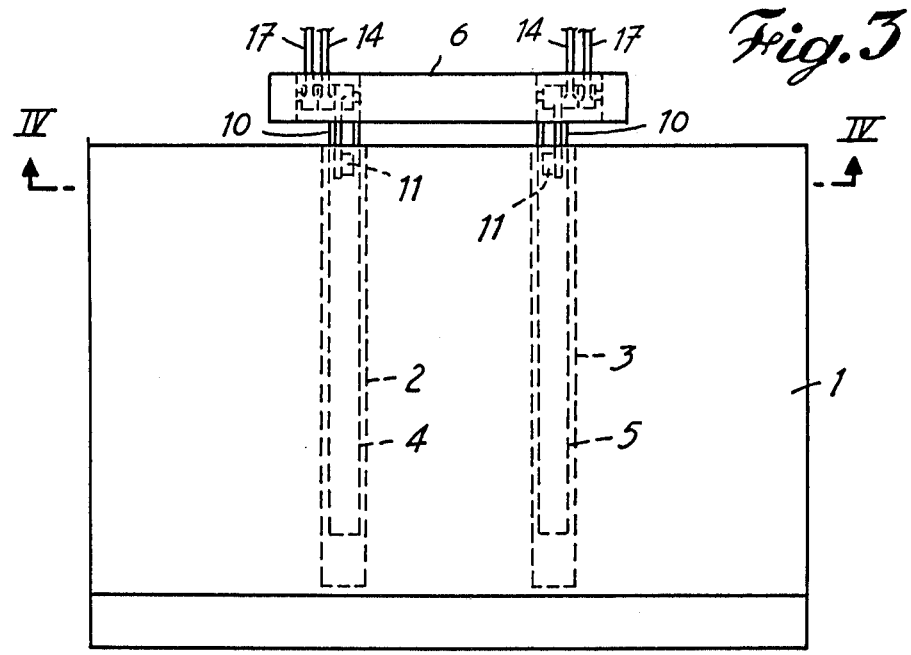
Figure 4:
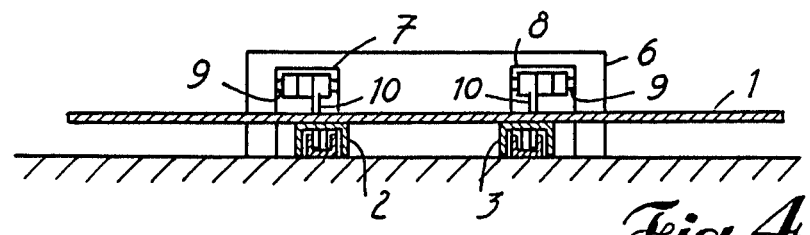
Figure 5:
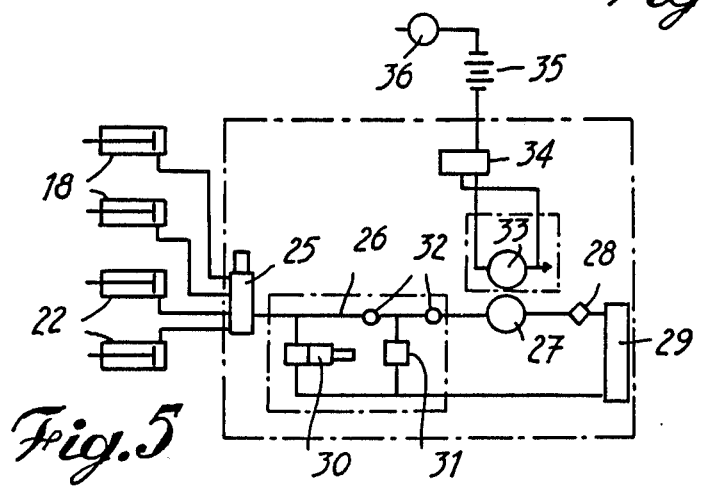

FIG. 3 provides a plan view of the loading platform;

FIG. 4 shows a cross-section of the platform along the line IV—IV in FIG. 3;

FIG. 5 shows a diagram of the hydraulic unit which actuates the loading platform.

In these figures can be seen the loading platform 1 which closes off the open slide of the vehicle and on which the load to be loaded or unloaded is placed and of which the front edge slopes downwards (FIG. 2) so that the load to be transported can be rolled or slid without difficulty onto the loading platform. Said loading platform 1 is fastened by two profiles 2,3 with a reversed U-shaped cross-section and which when the loading platform is lowered fully onto the ground fit over two profiles 4,5 with a U-shaped cross-section (FIG. 4). These two profiles are mounted on or form an integral part with a cross member 6 provided with two spaces 7,8 located opposite said profiles. A swivel pin 9 is freely mounted in each space, to which a rigid V-shaped tilting arm 10 is swivel-mounted which is provided at its free end with a support, such as a dolly wheel 11, which runs in the adjacent profile 2, or 3, and on which the body of said profile rests. As a result the loading platform is borne entirely by said two dolly wheels 11. Two bearing rods 12, 13 are swivel-mounted inside and between each profile 2, or 3, and each profile 4 or 5, which ensure that the loading platform can be adjusted in height parallel to the ground surface in order to bring the surface of the loading platform as closely as possible to the surface of the ground, as will be apparent from the description of the operation of the device given below. A guide rod 14 is also swivel-mounted at one end to each spindle 9, the other end of which is mounted on a spindle 15 which is mounted in a bearing frame 16. Similarly the piston rod 17 of a hydraulic lifting cylinder 18 is coupled to each spindle 9 and this cylinder swivels on a spindle 19 which is mounted in the bearing frame 16 of the transport vehicle. These lifting cylinders are capable of moving horizontally the entire structure of loading platform 1, cross-member 6, profile 2, 3, 4, 5, bearing rods 12, 13 and tilting arms 10 between the loading area of the transport vehicle and the surface of the ground. Running parallel with each guide rod 14 a hydraulic tipping cylinder 22 with piston rod 23 is swivel-mounted between a spindle 20 mounted in the bearing frame 16 and a spindle 21 located on each V-shaped tipping arm 10. These tipping cylinders make it possible by the action of the V-shaped tilting arms 10 and the bearing rods 12, 13 to change the height of the loading platform 1 parallel to the surface of the ground over the cross-member 6, so that in this way the loading platform is placed horizontally on the surface of the ground, so that the load to be transported can be easily as safely wheeled or slid onto or off the loading platform. This thus prevents the loading platform taking up a sloping position which would cause the load, particularly when it is loaded onto a cart, to roll or slide back off the sloping surface. The lifting and tipping cylinders 18, 22 are connected in a known fashion by hoses 24 to a closed-circuit hydraulic oil pump unit (FIG. 5). These cylinders are controlled by a control valve 25 connected to a circuit line 26 in which a pump 27, an oil filter 28, an oil tank 29, a relief valve 30, a safety valve 31, and non-return valves 32 are provided. The pump 27 is driven by an electric motor 33 which is connected to an electrical circuit with starter relay 34, battery 35 and dynamo 36.

To use the loading platform which in the vertical position shuts off the loading space of the transport vehicle, the control valve 24 is actuated in such a way that the tipping cylinders 22 exert a pulling force on the V-shaped tilting arms 10, so that the dolly wheels 11 exert a pushing force on the profiles 4, 5 and the loading platform with the cross-member 6 causing them to rotate around the spindles 9 so that they take up a position in the continuation of the line of the loading surface of the transport vehicle (shown in dotted lines in FIG. 1). Afterwards the control valve 24 is set to a position so that the lifting cylinders 18 operate and the loading platform, borne by the dolly wheels 11 and the bearing rods 12, 13, is moved horizontally to the ground surface. When the ground surface is reached the control valve 24 is operated agains so that the tipping cylinders 22 again operate, causing a pulling force to be exerted on the V-shaped tilting arms 10. As a result the dolly wheels 11 and the loading platform 1 bearing on them are lowered and through the agency of the bearing rods 12, 13 lowered perfectly horizontally to the ground surface, and the U-shaped profiles 2 and 3 fit over profiles 4 and 5. The load can now be placed without difficulty onto the loading platform, without there being any danger that it should roll off, slide or tip over.

In order to move the loading platform to the loading surface of the transport vehicle, the control valve 24 is set in such a way that the tipping cylinders 22 move the tilting arms 10 and press the dolly wheels 11 against the body of the profiles 2, 3 so that the loading platform 1, thanks to the bearing rods 12, 13 which are swivel-mounted between profiles 2 and 4 and profiles 3 and 5 move over a small vertical distance in horizontal plane in front of the cross-member 6. Afterwards the control valve 24 is adjusted in such a way that the lifting cylinders 18 move the whole horizontally upwards until the loading area of the transport vehicle is reached. When the load has been transferred from the loading platform to the transport vehicle, the control valve 24 is moved to a position in which the tipping cylinders 22 are actuated and pressure is exerted on the V-shaped tilting arms 10. As a result the dolly wheels 11 press on profiles 2-3 on which the loading platform 1 is mounted and this tips the loading platform 1 and the cross-member 6 to which profiles 4, 5 are attached, which are in turn connected by the bearing rods 12, 13 to said profiles 2 and 3, from 4 and 5 respectively, around the spindles 9, so that the loading platform is brought into the vertical position and the loading open of the transport vehicle is shut off.

It goes without saying that the shape, dimensions, number and the layout of the parts with respect to one another may differ and that moreover some of these parts could be replaced by other which have the same purpose.

I claim:

1. Device for controlling a loading platform for transport vehicles, comprising in combination a cross-member adjustable in height and rotatable through 90° on swivel spindles, supporting beams which form part of the lower part of the cross-member, a loading platform adjustable in height above and parallel to said supporting beams in front of the cross-member and fitting over said supporting beams when the loading platform rests on the ground surface, tilting arms swively mounted on said swivel spindles of the cross-member, said tilting arms are provided with supports on which said loading platform rests and intended for exerting a force on said supporting beams when tipping the loading platform, bearing rods swivel mounted between said loading platform and said support beams and intended for maintaining the load platform horizontal when it is moved vertically in front of said cross-member, guide rods swivel mounted between said swivel spindles of the cross member and the transport vehicle, at least one lifting cylinder swivel connected between the transport vehicle and said swivel spindles of the cross-member and intended for altering the height of the loading platform between the loading surface of the transport vehicle and the ground surface and maintaining it horizontal, and at least one tipping cylinder mounted parallel to said guide rods and swivel connected between the transport vehicle and said tilting arms and intended for tilting the cross-member with the supporting beams and the loading platform through 90° around said swivel rods of the cross-member in a horizontal or vertical position and for tilting said tilting arms with said supports on which said loading platform rests.

2. Device as defined in claim 1, in which the tilting arms are V-shaped, one end of each tilting arm is swivel connected to a swivel spindle of the cross-member, the other end bears a support co-operating with the loading platform and the middle section is swivel mounted on the piston rod of the tipping cylinder.

3. Device as defined in claim 1, in which the bottom of the cross-member is provided with two holes, in each hole is freely mounted a swivel spindle on which is swivel mounted one end of a guide rod and of a lifting cylinder is also swivel mounted on said spindle, the other end of the guided rod and the lifting cylinder is swivel mounted on the transport vehicle.

4. Device as defined in claim 1, in which the loading platform is mounted on two longitudinal profiles with an upside-down U-shaped cross-section fitting over the tilting arms and the bearing rods, the cross-member is extended by two support beams with a U-shaped cross-section, said profiles fitting over the support beams when the loading platform is located against the surface of the ground.

* * * * *